(12) United States Patent
Wei et al.

(10) Patent No.: US 11,387,464 B2
(45) Date of Patent: Jul. 12, 2022

(54) INTERMETALLIC L10-NIPTAG CATALYSTS FOR OXYGEN REDUCTION REACTION

(71) Applicant: Toyota Motor Engineering and Manufacturing North America, Inc., Erlanger, KY (US)

(72) Inventors: Kecheng Wei, Providence, RI (US); Tomoyuki Nagai, Nagakute (JP); Li Qin Zhou, Okemos, MI (US); Hongfei Jia, Ann Arbor, MI (US)

(73) Assignee: TOYOTA MOTOR ENGINEERING AND MANUFACTURING NORTH AMERICA, INC., Plano, TX (US)

(*) Notice: Subject to any disclaimer, the term of this patent is extended or adjusted under 35 U.S.C. 154(b) by 241 days.

(21) Appl. No.: 16/716,127

(22) Filed: Dec. 16, 2019

(65) Prior Publication Data

US 2021/0184227 A1 Jun. 17, 2021

(51) Int. Cl.
 *H01M 8/00* (2016.01)
 *H01M 4/92* (2006.01)
 *C22C 5/04* (2006.01)
 *C22F 1/14* (2006.01)
 *B22F 9/24* (2006.01)
 *B22F 1/054* (2022.01)

(52) U.S. Cl.
 CPC .............. *H01M 4/921* (2013.01); *B22F 1/054* (2022.01); *B22F 9/24* (2013.01); *C22C 5/04* (2013.01); *C22F 1/14* (2013.01); *B22F 2301/25* (2013.01)

(58) Field of Classification Search
 CPC ........................................................ H01M 8/00
 See application file for complete search history.

(56) References Cited

U.S. PATENT DOCUMENTS

| 9,005,331 | B2 | 4/2015 | Adzic et al. |
| 9,680,161 | B2 | 6/2017 | Yang et al. |
| 2013/0133483 | A1 | 5/2013 | Yang et al. |
| 2019/0198885 | A1 | 6/2019 | Kuttiyiel et al. |

OTHER PUBLICATIONS

Prior art Wu et al. ("Core/shell AgNi/PtAgNi nanoparticles as methanol-tolerant oxygen reduction electrocatalysts" Electrochimica Acta vol. 180, Oct. 20, 2015, pp. 316-322).*
Junrui Li et al., "Fe Stabilization by Intermetallic L10-FePt and Pt Catalysis Enhancement in L10-FePt/Pt Nanoparticles for Efficient Oxygen Reduction Reaction in Fuel Cells", Journal of American Chemical Society, 2018, vol. 140, pp. 2926-2932.

(Continued)

*Primary Examiner* — Jacob B Marks
(74) *Attorney, Agent, or Firm* — Jordan IP Law, LLC

(57) ABSTRACT

An electrode catalyst for an oxygen reduction reaction including intermetallic $L1_0$-NiPtAg alloy nanoparticles having enhanced ORR activity and durability. The catalyst including intermetallic $L1_0$-NiPtAg alloy nanoparticles is synthesized by employing silver (Ag) as a dopant and annealing under specific conditions to form the intermetallic structure. In one example, the intermetallic $L1_0$-NiPtAg alloy nanoparticles are represented by the formula: $Ni_xPt_yAg_z$ wherein $0.4 \leq x \leq 0.6$, $0.4 \leq y \leq 0.6$, $z \leq 0.1$.

5 Claims, 5 Drawing Sheets

Solid solution structure

Intermetallic L1₀ structure

(56) References Cited

OTHER PUBLICATIONS

Junrui Li et al., "Hard-Magnet L10-CoPt Nanoparticles Advance Fuel Cell Catalysis". Joule, Jan. 16, 2019, pp. 124-135, vol. 3, Elsevier.
Sabrina C. Zignani et al., "Towards Highly Performing and Stable PtNi Catalysts in Polymer Electrolyte Fuel Cells for Automotive Application", Materials, 2017, 17 pages, vol. 10, No. 3:317, mdpi.com/journal/materials.
Liangliang Zou et al., "Conversion of PtNi alloy from disordered to ordered for enhanced activity and durability in methanol-tolerant oxygen reduction reactions", Nona Research, 2015, pp. 2777-2788, 8(8), Springer.
Brian M. Leonard et al., "Facile Synthesis of PtNi Intermetallic Nanoparticles: Influence of Reducing Agent and Precursors on Electrocatalytic Activity", Chemistry of Materials, 2011, pp. 1136-1146, 23, ACS Publications.
Hanbin Wang et al., "One-Step Synthesis of High-Coercivity L10-FePtAg Nanoparticles: Effects of Ag on the Morphology and Chemical Ordering of FePt Nanoparticles", Chemistry of Materials, 2013, pp. 2450-2454, vol. 25 (12), American Chemical Society.
L. Xiong et al. "Influence of atomic ordering on the electrocatalytic activity of Pt—Co alloys in alkaline electrolyte and proton exchange membrane fuel cells", Journal of Materials Chemistry, 2004, pp. 1454-1460, 14.9.
Tomoyuki Nagai et al., "Improved Accelerated Stress Tests for ORR Catalysts Using a Rotating Disk Electrode", Journal of The Electrochemical Society, 2019, pp. F3111-F3115, 166(7).

\* cited by examiner

INTERMETALLIC L10-NIPTAG CATALYSTS FOR OXYGEN REDUCTION REACTION

TECHNICAL FIELD

The present disclosure generally relates to an electrode catalyst for oxygen reduction reactions comprising alloy nanoparticles with an intermetallic structure for improved activity and durability, and the process for the synthesis of said catalyst.

BACKGROUND

The background description provided herein is for the purpose of generally presenting the context of the disclosure.

Proton exchange membrane fuel cells (PEMFCs) have been proven to be a promising energy conversion device to solve the issue of increasing global energy demand because a PEMFC can convert chemical energy from hydrogen, a renewable energy source, into electrical energy. The major energy loss is at cathode side, where the oxygen reduction reaction (ORR) takes place. To tackle this problem, catalysts with higher activity and durability are required.

In general, NiPt alloy nanoparticles (NPs) catalysts show much higher ORR activity than other Pt-based alloy catalysts and conventional Pt/C catalysts, but they have a problem with stability owing to Ni leaching under an acidic electrochemical working environment. An intermetallic structure was introduced to solve the stability issues of Pt-based alloy catalysts due to the lattice strain effect. While intermetallic $L1_0$-FePt and CoPt have been well studied, intermetallic $L1_0$-NiPt has been rarely reported and showed poorer performance. From a thermal dynamics and kinetics point of view, it is more difficult to synthesize intermetallic $L1_0$-NiPt using a conventional thermal annealing method.

SUMMARY

This section provides a general summary of the disclosure and is not a comprehensive disclosure of its full scope or all of its features.

In one aspect there is provided an electrode catalyst for oxygen reduction reaction comprising intermetallic $L1_0$-NiPtAg alloy nanoparticles having excellent ORR activity and durability. In one embodiment, the intermetallic $L1_0$-NiPtAg alloy nanoparticles are represented by the formula: $Ni_xPt_yAg_z$, wherein $0.4 \leq x \leq 0.6$, $0.4 \leq y \leq 0.6$, $z \leq 0.1$.

In another aspect there is provided a method for the synthesis of a catalyst comprising intermetallic $L1_0$-NiPtAg alloy nanoparticles represented by the formula: $Ni_xPt_yAg_z$ wherein $0.4 \leq x \leq 0.6$, $0.4 \leq y \leq 0.6$, $z \leq 0.1$. The method comprises co-reduction of reducible metal precursors, seeding with Ag, and contacting the Ag seeded solution with an inert gas at a certain temperature to produce NiPtAg alloy nanoparticles; loading the NiPtAg alloy nanoparticles onto a carbon support; and annealing to form the $L1_0$-NiPtAg intermetallic structure.

Further areas of applicability and various methods of enhancing the above technology will become apparent from the description provided herein. The description and specific examples in this summary are intended for purposes of illustration only and are not intended to limit the scope of the present disclosure.

DRAWINGS

The present teachings will become more fully understood from the detailed description and the accompanying drawings wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DESCRIPTION

Figure 1:
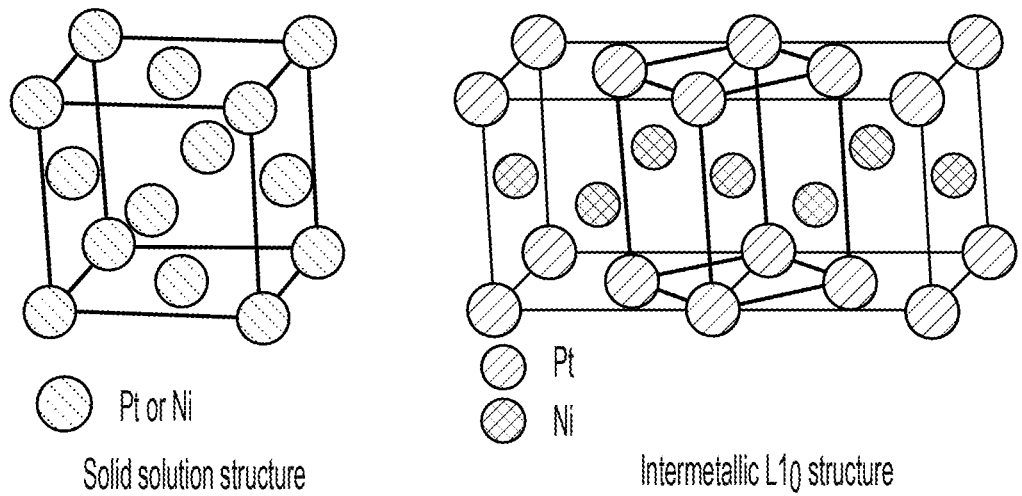
FIG. 1 is a schematic illustration of solid solution structure and intermetallic structure.

The present teachings provide an electrode catalyst for an oxygen reduction reaction. More specifically, the catalyst of the present disclosure comprises intermetallic $L1_0$-NiPtAg alloy nanoparticles. For example, referring to FIG. 1, in a solid solution structure, Pt and Ni atoms are randomly distributed, whereas for an intermetallic structure, Pt atoms and Ni atoms form a layer by layer ordered structure. This ordered structure will create lattice strain effect which leads to enhanced ORR activity and stability of the alloy particles. Additionally, the $L1_0$-NiPt structure has Ni(3d)-Pt(5d) strongly coupled along the crystallographic c-direction, thus creating lattice strain effect and alerting the electronic state of Pt, which leads to enhanced ORR activity and stability.

The intermetallic alloy nanoparticles of the present disclosure may be formed by doping a MPt alloy system, wherein M may be selected from Ni, Cr, Mn, Co, Zn and combinations thereof to make a tri-metallic $L1_0$ structure such as (CoNi)Pt, with silver (Ag) to form a $L1_0$-MPtAg intermetallic structure, e.g., $L1_0$-NiPtAg. In an exemplary embodiment, the intermetallic alloy nanoparticles have the formula: $Ni_xPt_yAg_z$, wherein x is from about 0.4 to about 0.6, y is from about 0.4 to about 0.6, and $z \leq 0.1$. In another exemplary embodiment, $x=y=0.5$. In yet another exemplary embodiment the size of the nanoparticles is about 5-6 nm.

The present disclosure also provides a process for the synthesis of intermetallic $L1_0$-NiPtAg, alloy nanoparticles, wherein Ag and specific annealing conditions are employed to promote the formation of the intermetallic structure. More specifically, NiPtAg nanoparticles in accordance with embodiments of the present disclosure may be synthesized using an Ag doping method. For example, the NiPtAg nanoparticles may be formed by a co-reduction method of reducible metal precursors, seeding with Ag, and contacting the Ag seeded solution with an inert gas at a certain temperature to produce NiPtAg alloy nanoparticles.

"Reducible metal precursors" are materials which on contact with a reducing agent at a particular temperature are reduced. "Reducing agent(s)" reduces the reducible metal precursor(s) to form metal alloy particles. The amount of Ag seeding during synthesis is in a range from about 0.01 to about 0.5 mole percent of all metal precursors. In an embodiment, the amount of Ag seeding is 0.3 mole percent. The NiPtAg alloy nanoparticles may then be supported onto a carbon support followed by annealing under suitable temperature and time to obtain an intermetallic structure.

Figure 2:
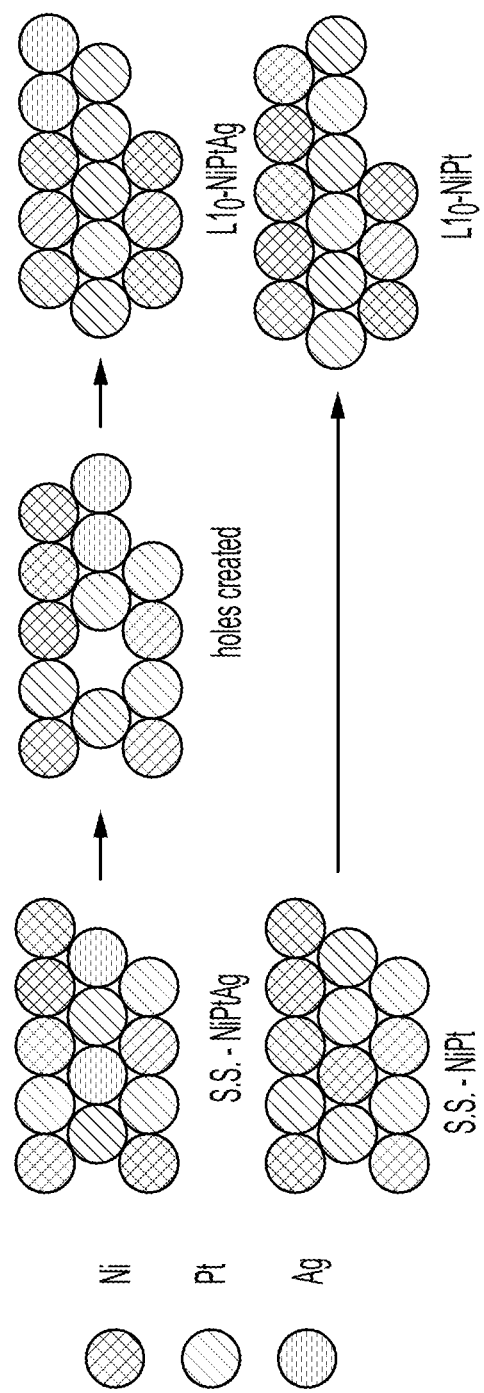
FIG. 2 is a schematic illustration of the concept of Ag doping.

The use of Ag to facilitate formation of the intermetallic structure is an advantageous technical feature of the present disclosure. For example, the presence of Ag in the as-synthesized nanoparticles enables control of the quality of the intermetallic structure compared to previously reported intermetallic NiPt. Referring to FIG. 2, during the reaction, Ag atoms are diffused and segregated out from the NiPt alloy system, which creates a lot of holes and defects. These defects then decrease the energy barriers for atoms to rearrange, thereby allowing a phase transformation into the intermetallic structure, i.e., a thermally dynamic stable phase. In addition, the organic solution phase synthesis, and seed mediated growth mechanism assures the quality of the particles (size distribution) compared to solid state synthesis methods previously reported. Though an Ag doping method has been applied into intermetallic FePtAg system, the FePtAg system was developed with poorer particle quality and was used only for magnetic application.

Figure 3:
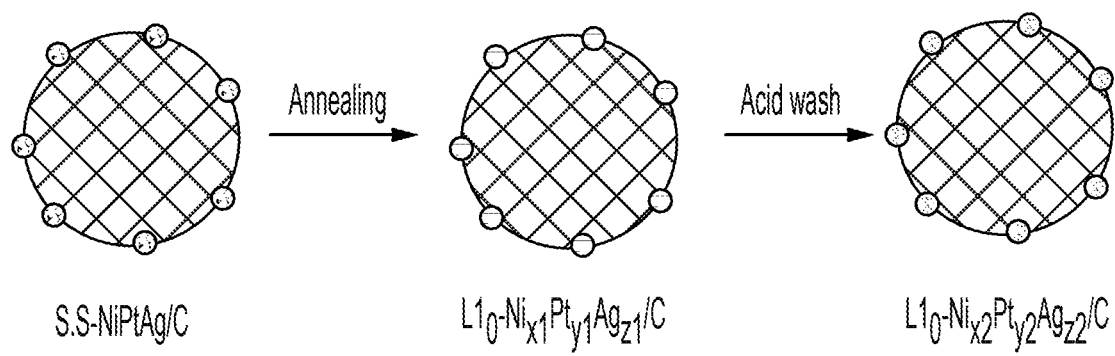
FIG. 3 is a schematic illustration of the preparation procedure of catalysts of the present invention.

The present disclosure also provides a process for the synthesis of catalysts comprising intermetallic $L1_0$-NiPtAg alloy nanoparticles. FIG. 3 illustrates the preparation of the catalysts. The as-synthesized nanoparticles may be loaded on a carbon support and then annealed in $Ar/H_2$ at a temperature in the range of about 300° C. to about 630° C. for a time period suitable to form the intermetallic structure. Other suitable gases may include but are not limited to $N_2/H_2$ and $H_2$. In one embodiment, the annealing temperature is in the range of 500° C. to 600° C. In another embodiment, the annealing temperature is in the range of 550° C. to 600° C. In another embodiment, the annealing temperature is 550° C. Higher temperatures above 630° C. may lead to sintering, reversal of the thermal dynamic stable phase, and suppressed ORR performance, while an annealing temperature that is too low results in a longer time to complete the phase transformation process. Coating the intermetallic alloy nanoparticles with MgO can avoid sintering issues and MgO can be removed with acid washing without interfering with the intermetallic structure. In another embodiment, the time period for annealing is at least 6 hours. A time period of 6 hours and longer for annealing yields a better ordering degree and advantages in facilitating formation of the intermetallic structure. Subsequently, the products may then be collected, and acid washed to remove excess Ag and create an ORR active Pt surface.

In an embodiment, the catalysts comprising intermetallic $L1_0$-NiPtAg alloy nanoparticles have enhanced ORR activity and durability. For example, a good ORR catalyst should meet the 2020 DOE target (440 $A/g_{Pt}$ in mass activity in a fuel cell device with acceptable durability (<40% loss in mass activity). In an embodiment of the present disclosure, the catalyst of the present invention has a mass activity (MA) of greater than 1000 $A/g_{Pt}$. In another embodiment, the catalyst of the present invention has a mass activity (MA) of greater that 1100 $A/g_{Pt}$. In another embodiment, the catalyst of the present invention also has MA retention greater than 40%. In another embodiment, the catalyst of the present invention has MA retention greater than 45%. Performance and durability of ORR catalyst is a key component of the cathode of PEMFCs. Such technical features may lead to the enhancement of FC stack performance & durability, and also cost reduction.

EXAMPLES

Various aspects of the present disclosure are further illustrated with respect to the following examples. It is to be understood that these examples are provided to illustrate specific embodiments of the present disclosure and should not be construed as limiting the scope of the present disclosure in or to any particular aspect.

Synthesis of NiPtAg Nanoparticles

In an example, 78.7 mg of $Pt(acac)_2$, 51.4 mg of $Ni(acac)_2$ were added into a 250 ml two-neck flask. Then 20 ml of oleylamine (OAm) was added. The solution was heated to 60° C. for 2 min with stirring then cooled down to room temperature. 28.6 mg of AgAc was added into the solution. The solution was then heated to 110° C. for 15 min under Argon flow. Subsequently, the solution was further heated to 250° C. and kept at 250° C. for 1 hour before being cooled down to room temperature. The products were collected and washed 3 times with acetone (or isopropyl alcohol (IPA)) and hexane (3:1 in volume) by sonicating for 1 min and centrifuging at 8500 rpm for 5 min. Finally, the NiPtAg NPs were dispersed in 35 ml hexane.

Preparation of NPs/C

In an example, 95.5 mg carbon (Ketjen black) was added to 60 ml hexane and sonicated for 30 min. 17.5 ml NPs in hexane was sonicated for 30 min. Then, the carbon dispersion and the NPs solution were mixed and sonicated for 1 hour in an ice bath. The obtained NPs/C were collected and washed 3 times with hexane by centrifuging at 8500 rpm for 1 min. Then NPs/C were dispersed in 30 ml of IPA, sonicated for 10 min, vacuum filtrated and dried in vacuum for 10 min. Subsequently, the NPs/C were collected into a vial and saved for later use.

Annealing of NPs/C

The samples were annealed in $Ar/H_2$ at 550° C. for 6 h.

Acid Treatment

In an example, 30 mg of NPs/C was added into 20 ml of 0.1 M $HNO_3$ solution. The solution was sonicated for 5 min and then heated to 60° C. for 1 h with stirring before cooled down to room temperature. The products were washed with DI water and centrifuged at 8500 rpm for 1 min for 3 times. Then the products were dispersed in 15 ml of IPA and 15 ml of DI water, sonicated for 10 min, vacuum filtrated and dried in vacuum for 10 min. After that, the products were collected into a vial and saved for later use.

Ink Preparation

In an example, 9.80 mg of samples were mixed with 81.56 μl of ionomer and 10 ml of 25% IPA and sonicated for 1 hour in an ice bath before use.

RDE Performance Evaluation

A potentiostat (VSP, BioLogic), an electrode rotator and a standard three-electrode glass cell (Pine Research Instrumentation) were used for electrochemical measurements. The working electrode was the catalyst-applied GC disk. The counter electrode (CE) was an in-house built platinized platinum electrode and the reference electrode (RE) was an in-house built reversible hydrogen electrode (RHE). The CE and the RE were isolated from the main cell compartment using a glass fritted tube. The catalysts were first activated by a cyclic voltammetry (CV) between 0.05 and 1.2 V at 100 mV/s in the $O_2$-saturated 0.1 M $HClO_4$ at 400 rpm for 80 cycles. Then, linear sweep voltammetry (LSV) was conducted from 0.05 to 1.05 V at 10 mV/s in $O_2$-saturated electrolyte at 900 rpm to evaluate the ORR activity. After that, cyclic voltammetry was conducted between 0.05 and 1.05 V at 50 mV/s in Ar-saturated 0.1 M $HClO_4$ at 50 rpm to determine the electrochemical surface area (ECSA), which was determined from the average of hydrogen adsorption and desorption charges approximately between 0.06 V and 0.4 V, assuming a specific charge of 210 $\mu C/cm_{Pt}^2$. The mass activity (MA) and the specific activity (SA) were determined by normalizing the kinetic current $i_k$ with the Pt amount and the ECSA, respectively.

Durability Performance Evaluation

Figure 5:
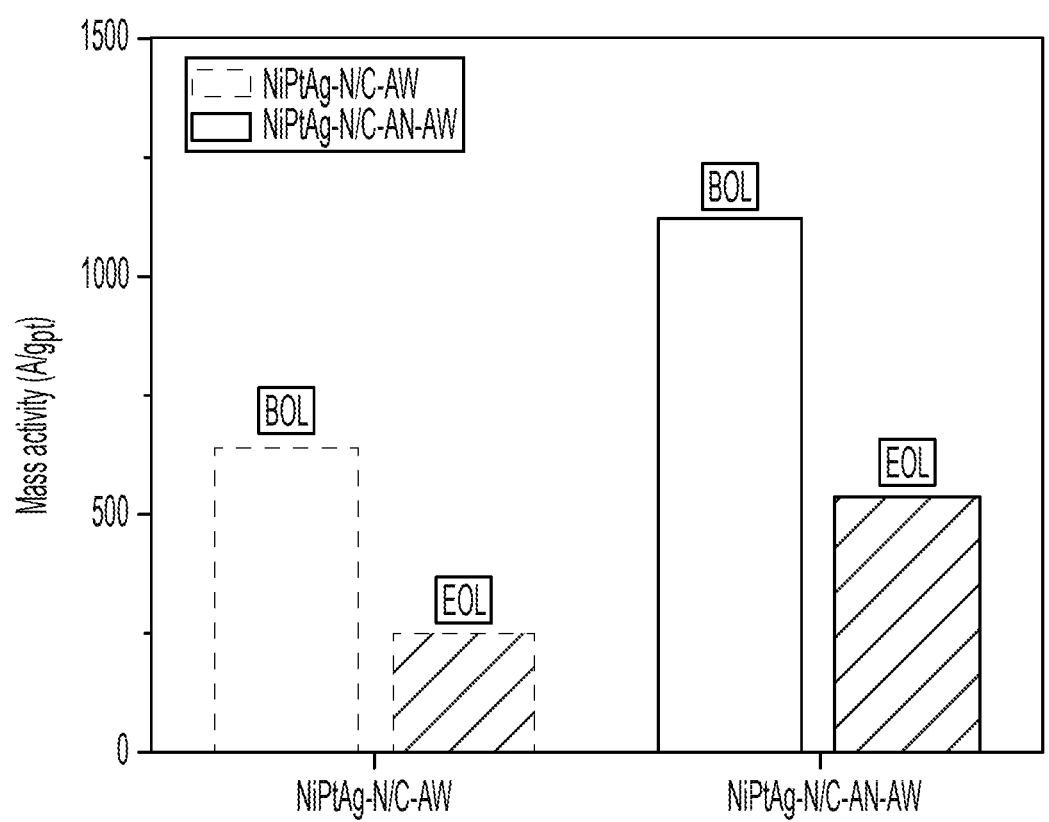
FIG. 5 illustrates mass activity (MA) of Solid Solution (S.S.) and $L1_0$-NiPtAg before and after the accelerated Stability Test (AST).

The accelerated stability test (AST) was conducted in $O_2$-saturated 0.1 M $HClO_4$ at 0 rpm between 0.4 V (3 s) and 1.0 V (3 s) for 10,000 cycles. CV and LSV was measured at 0, 200, 400, 800, 1,000, 2,000, 3,000, 4,000, 5,000, 6,000, 7,000, 8,000, 9,000 and 10,000 cycles to determine the catalysts intermediate state performance. The details of the measurement of the intermediate state ECSA, MA and SA are as described by Nagai, et al., "Improved Accelerated Stress Tests for ORR Catalysts Using a Rotating Disk Electrode", Journal of the Electrochemical Society, 166(7) F3111-F3115, which is incorporated herein by reference. Referring to FIG. 5, intermetallic $L1_0$ NiPtAg showed higher MA (1120 $A/g_{Pt}$) and MA retention (47%) after 10,000 (10K) cycles of the Accelerated Stability Test (AST) compared to its solid solution NiPtAg counterpart with the MA (686 $A/g_{Pt}$) and MA retention (37%).

Characterization of $Pt_xNi_{1-x}$/C Pt

Figure 4:
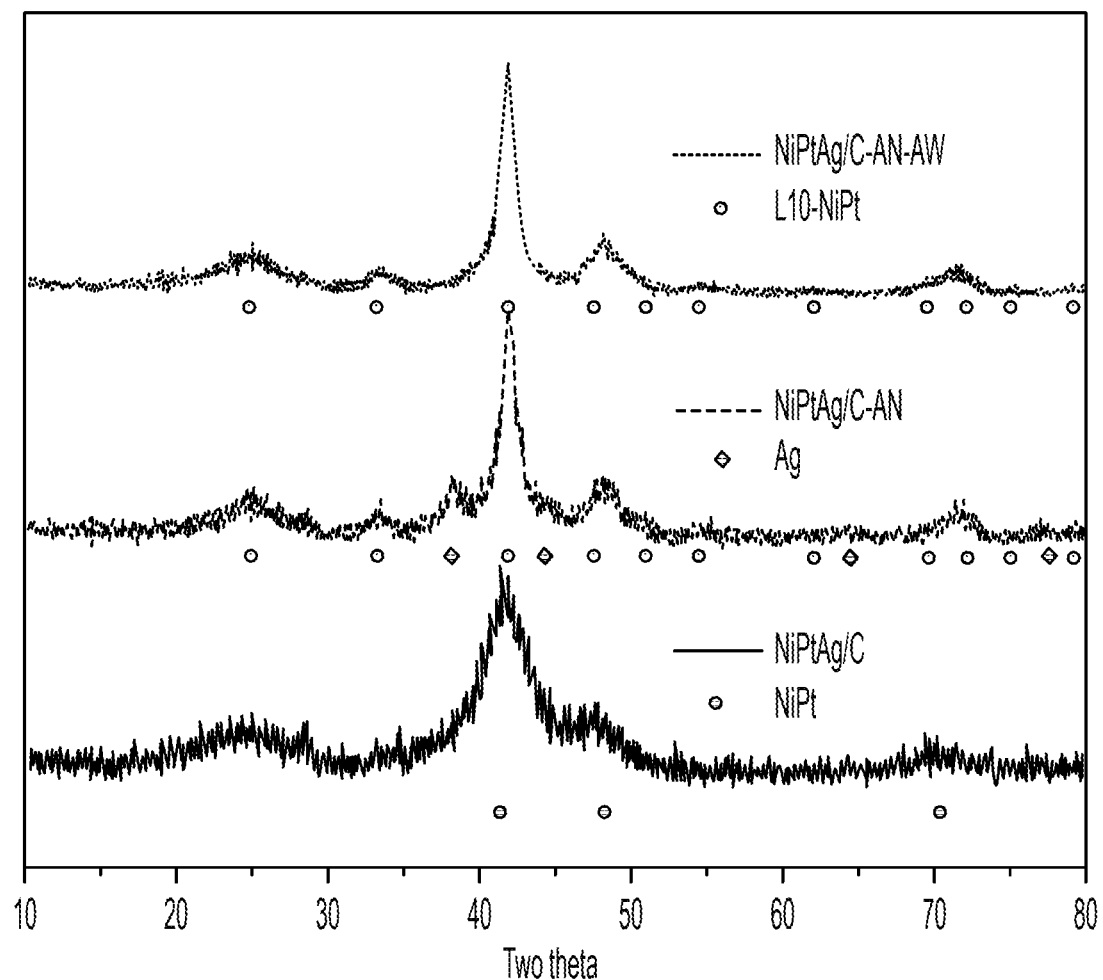
FIG. 4 illustrates XRD of NiPtAg as-synthesized, after annealing, an after acid washing.

The shape and size of the NPs were characterized using transmission electron microscopy (TEM). The crystallography structure of the NPs/C powder was characterized by X-ray diffraction (XRD, Rigaku Smartlab) with Cu Kα radiation. Referring to FIG. 4, the diffraction peaks attributed to the intermetallic $L1_0$-NiPt structure, which is indicated by circles with a dot inside "⊙", appeared after annealing and was retained after acid washing. This result suggests the formation of Intermetallic $L1_0$-NiPt.

Catalyst materials in accordance with embodiments of the present disclosure may be used to catalyze an oxygen reduction reaction (ORR), an oxygen evolution reaction (OER), formic acid oxidation reaction (FAOR), methanol oxidation reaction (MOR), ethanol oxidation reaction (EOR), and the like. For example, the catalyst material of the present invention can be used in a fuel cell (e.g., hydrogen proton exchange membrane fuel cells (PEMFCs), direct formic acid fuel cells, direct methanol fuel cells (DMFCs), direct ethanol fuel cells and the like) or metal-air battery.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. An electrode catalyst for oxygen reduction reaction comprising intermetallic $L1_0$-NiPtAg alloy nanoparticles, having mass activity (MA) of greater than 1000 $A/g_{Pt}$.

2. The catalyst according to claim 1, wherein the intermetallic $L1_0$-NiPtAg alloy nanoparticles have mass activity (MA) greater than 1100 $A/g_{Pt}$.

3. The catalyst according to claim 1, wherein the intermetallic $L1_0$-NiPtAg alloy nanoparticles have mass activity (MA) retention greater than 40%.

4. The catalyst according to claim 1, wherein the intermetallic $L1_0$-NiPtAg alloy nanoparticles have mass activity (MA) retention greater than 45%.

5. The catalyst according to claim 1, wherein the intermetallic $L1_0$-NiPtAg alloy nanoparticles are represented by the formula: $Ni_xPt_yAg_z$, wherein $0.4 \leq x \leq 0.6$, $0.4 \leq y \leq 0.6$, $z \leq 0.1$.

* * * * *